United States Patent [19]

Kondo et al.

[11] 4,038,672
[45] July 26, 1977

[54] INTERLOCKING DEVICE FOR A CAMERA

[75] Inventors: Hidenobu Kondo, Yokohama; Yoshiyuki Nakano, Tokyo, both of Japan

[73] Assignee: Nippon Kogaku K.K., Tokyo, Japan

[21] Appl. No.: 604,032

[22] Filed: Aug. 12, 1975

[30] Foreign Application Priority Data

Aug. 23, 1974 Japan .................. 49-100233[U]

[51] Int. Cl.² ........................................... G03B 17/38
[52] U.S. Cl. ..................................... 354/212; 354/268
[58] Field of Search ............... 354/202, 204, 205, 206, 354/212, 268

[56] References Cited

U.S. PATENT DOCUMENTS

| 3,367,251 | 2/1968 | Furuta | 354/212 |
|---|---|---|---|
| 3,693,524 | 9/1972 | Furuta | 354/268 |
| 3,810,217 | 5/1974 | Matsumoto | 354/204 |
| 3,914,778 | 10/1975 | Sugiura | 354/268 |

Primary Examiner—L. T. Hix
Assistant Examiner—Alan Mathews
Attorney, Agent, or Firm—Fitzpatrick, Cella, Harper & Scinto

[57] ABSTRACT

An interlocking device for a camera release of an interlock between a film advance lever and a shutter release button and a power switch when the film advance lever is in a housed position. This device comprises a rotating cam interlocking the film advance lever, and an operating lever to lock the shutter release button and at the same time to open the power switch in a first position, and to unlock the shutter release button and at the same time to close the power switch in a second position. This device also comprises an outside operating lever which can rotate the first operating lever to the second position selectively even when the advance lever is in the first position to release the interlock.

4 Claims, 3 Drawing Figures

INTERLOCKING DEVICE FOR A CAMERA

BACKGROUND OF THE INVENTION

1. Field of the Invention

This invention relates to an interlocking release device of an interlocking device which locks a shutter release button and closes and opens a power switch in accordance with a position of a film advance lever.

2. Description of the Prior Art

An interlocking device is known according to which the rotation of a film advance lever a given amount from a housed position in a camera body, does not wind a roll film (the terminal position of this section is hereinafter called a preparatory position); and upon rotation of the film advance lever from such a perparatory position, the roll film is wound up. In the lever housed position the power switch of an automatic exposure control curcuit, or an exposure meter circuit, as the case may be, is opened and the shutter release button is locked at the same time to block a shutter release mechanism; and on the contrary in the preparatory position, the power switch is closed and the shutter release button is unlocked.

The above-mentioned prior art device however, has a difficulty in operation that when a roll film winding motor drive apparatus is mounted in the camera, it is somewhat troublesome to rotate the film advance lever from the housed position to the preparatory position. Another inconvenience of the device resides in the fact that, as the film advance lever is projected out of the camera body in the preparatory position, it may approach or strike the face of a photographer and disturb him at a critical time.

SUMMARY OF THE INVENTION

We have conceived by out invention a device for effecting an interlock between the film advance lever and the shutter release button and the power switch, wherein the interlocking between them can be released to close the power switch and to unlock the shutter release button as the photographer desires even in the housed position of the film advance lever.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
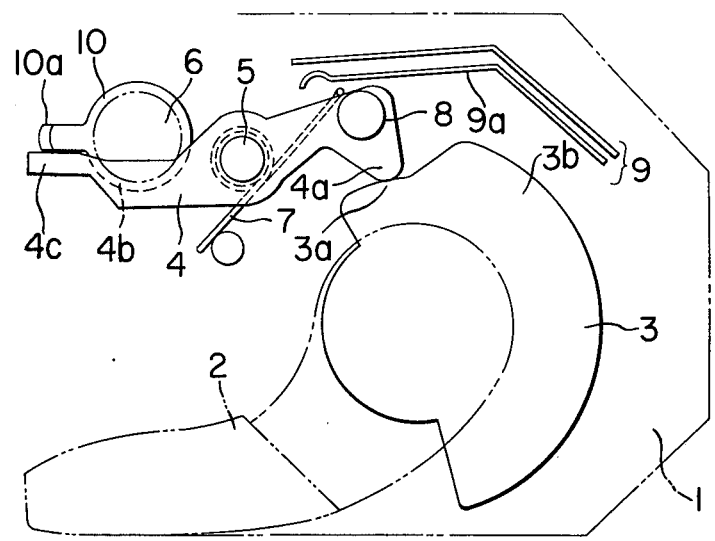
FIG. 1 is a front view of the embodiment of the present invention showing the housed state of the film advance lever.

Referring now to FIG. 1, the film advance lever 2 is shown in a camera body 1 in a housed position. A cam 3 which rotates with the film advance lever 2 has two cam faces 3a and 3b. The distance between the cam surface 3b and a rotational center of the cam is longer than that between the cam surface 3a and the rotational center of the cam. An operating lever 4 pivoted to the camera body 1 by a shaft 5 has one end portion 4a arranged to engage the cam surfaces 3a and 3b, a locking portion 4b to block the operation of a shutter release button 6 and another end portion 4c to engage an outside operating member which will hereinafter be described.

The operating lever 4 is biased clockwise by a spring 7. An insulating pin 8 is secured to the operating lever 4 to engage one contact 9a of a power switch 9 of an automatic exposure control circuit or an exposure meter circuit and others (not shown) of a camera. An operating member 10, to be operated from outside the camera, is pivotally supported around the shutter release button 6. When the film advance lever stays in the housed position, as shown in FIG. 1, the end portion 4a of the operating lever 4 engages the cam surface 3a, the insulating pin 8 is separated from the contact 9a to open the switch 9, and the locking portion 4b blocks the operation of the shutter release button 6 in the sliding locus of the button.

Therefore, in the housed position, the automatic exposure control circuit, or the exposure meter circuit, is not in operation and the shutter cannot be released.

When the film advance lever 2 is rotated counterclockwise from the housed position just through the preparatory section, the lever reaches the preparatory position without advancing the film. During this time, the cam 3 also rotates counterclockwise to turn the operating lever 4 counterclockwise and thereby, the cam surface 3a is shifted away from end portion 4a of operating lever 4 while cam surface 3b comes into position to engage the end portion 4a of the operating lever 4.

Figure 2:
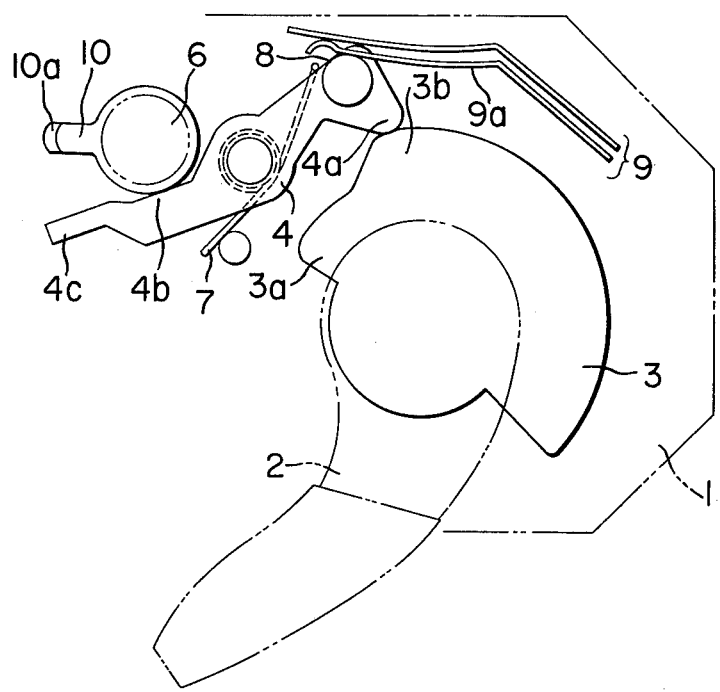
FIG. 2 shows the film advance lever drawn to the preparatory position.

Accordingly, the insulating pin 8 closes the power switch 9, as shown in FIG. 2, and the locking portion 4b draws back out of the sliding locus of the shutter release button 6. Then the automatic exposure control circuit or the exposure meter circuit operates, and the shutter release button can be pushed.

In the preparatory position, a part of the film advance lever 2 projects out of the camera body 1. The lever is designed to wind up the film when further turned counterclockwise from this position, and automatically to return to the preparatory position when released from a finger after accomplishing the winding.

Accordingly, the winding up speed of the film increases as it is easy to lay a finger on the lever in the preparatory position. There are such cases where the film advance lever is not used as an automatic winding device which winds up the film and performs shutter charging such as when a motor drive is mounted in the camera.

Figure 3:
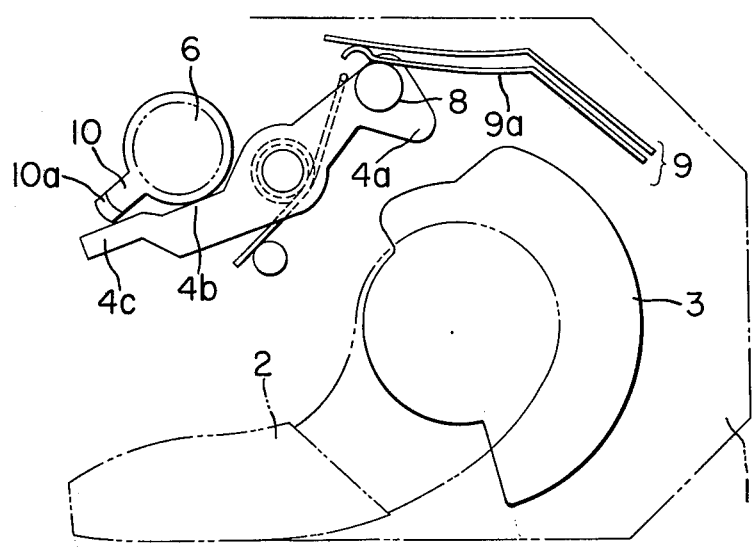
FIG. 3 shows the state in which the film advance lever stays at the housed position and an outside operation member is operated.

In these cases, though the lever is kept in the housed position, the shutter release button can be used and the power switch can be closed by operating the outside operating member explained below. As seen in FIG. 3, when the outside operating member 10 is turned counterclockwise, the operating lever 4 is rotated counterclockwise against the biasing force of the spring 7 by the engagement of the end portion 10a of the member 10 with the end portion 4c of the operating lever 4 to unlock the shutter release button 6 and to close the power switch 9.

The outside operating member 10 is designed to be stopped at the position shown in FIG. 3 by some stopping means like a clip (not shown). Therefore, although the film advance lever 2 is in the housed position, it is possible to close the power switch 9 and to push the shutter release button only by rotating the outside operating member 10.

According to the present invention, as seen above, as the geometry of the rotating cam 3 is designed so that the distance between the cam surface 3a and the rotational center of the cam is shorter than that between the cam surface 3b and the rotational center, the operating lever can be turned to the position in which the one end portion 4a is engaged with the cam surface 3b only by operating the operating member 10 from outside even when the lever 2 is in the housed position.

Therefore, even when the film advance lever stays in the housed position, it is possible with a very simple construction to push the shutter release button and to turn the power switch on by the operation of the outside operating member.

We believe that the construction and operation of our novel interlock device will now be understood and that the advantages thereof will be fully appreciated by those persons skilled in the art.

We claim:

1. In a device for a camera wherein the operation of a shutter release mechanism is blocked and a power switch is opened when a film advance lever is in a position housed in a camera body, and the blocking of said shutter release mechanism is released and the power switch is closed when said film advance lever is in a preparatory position extending out of the camera body a predetermined distance without having advanced the film; the improvement which comprises:
   a. a working member engageable with both said shutter release mechanism and the power switch, and movable between a first position in which the working member blocks the operation of said shutter release mechanism and opens the power switch and a second position in which the working member releases said blocking and closes the power switch;
   b. means for actuating said working member in coordination with said film advance lever to the first position when the film advance lever is in the housed position and to the second position when the film advance lever is in the preparatory position; and
   c. an operating member operable from the exterior of said camera to interrupt the cooperation between said actuating means and said working member when said film advance lever in in the housed position and to move said working member to the second position, whereby the cooperation between said film advance lever, the shutter release mechanism and the power switch can be interrupted when said film advance lever is in the housed position.

2. A device according to claim 1, wherein said actuating means comprises a rotating cam engaging with said working member, and means for biasing said working member to contact said rotating cam.

3. A device according to claim 2, wherein said working member is a rotating lever having a blocking portion for the shutter release mechanism, a portion turning on and off the power switch, and an operating portion engaging with said operating member.

4. A device according to claim 3, wherein the operating member is pivotally engaged around the shutter release button and has a portion engageable with said operating portion of said working member to effect actuation of said working member.

* * * * *